June 25, 1968     E. V. MITCHELL     3,389,406
RETRACTABLE MUD VISOR FOR GOGGLES
Filed July 28, 1966     2 Sheets-Sheet 1
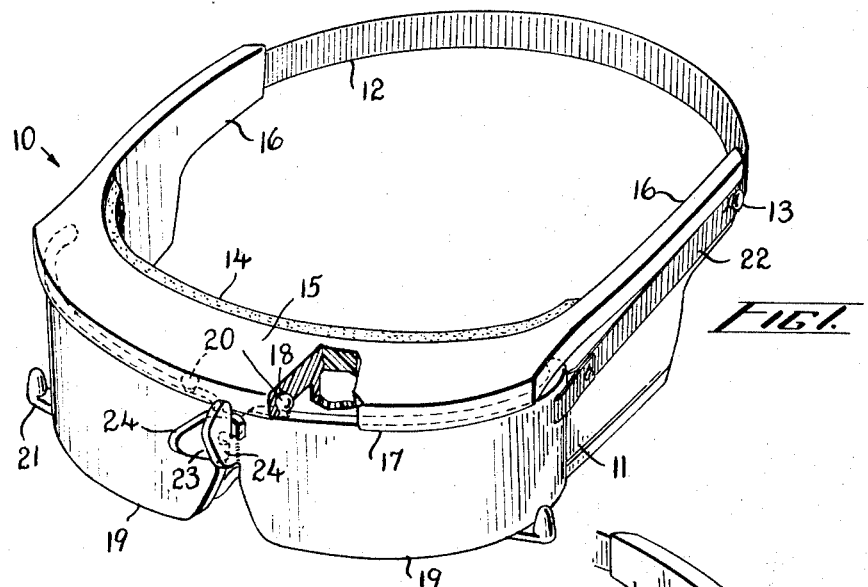
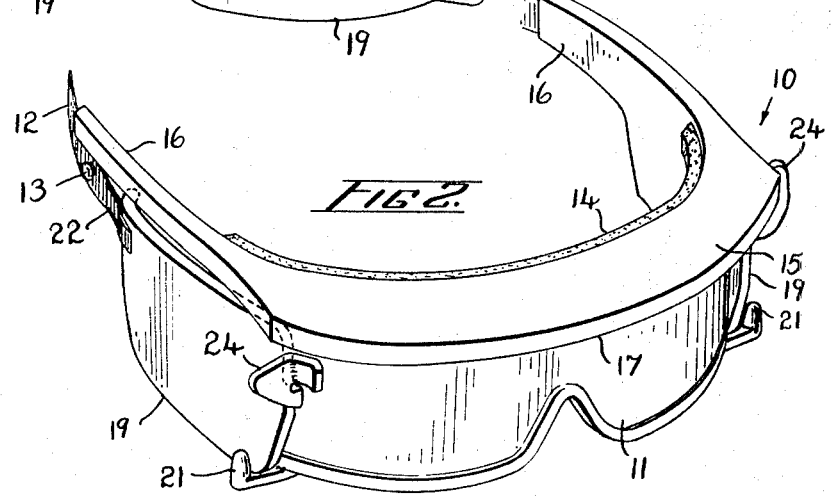
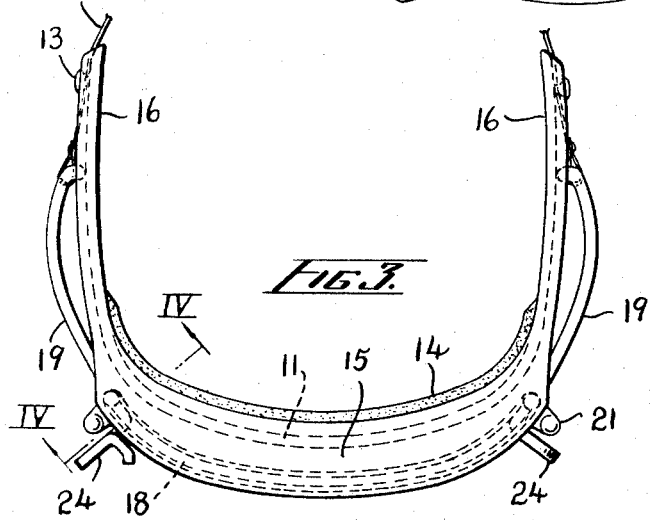
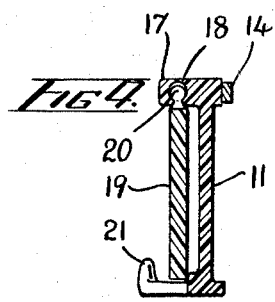
INVENTOR
EUGENE V. MITCHELL
BY Maybee & Legris
ATTORNEY

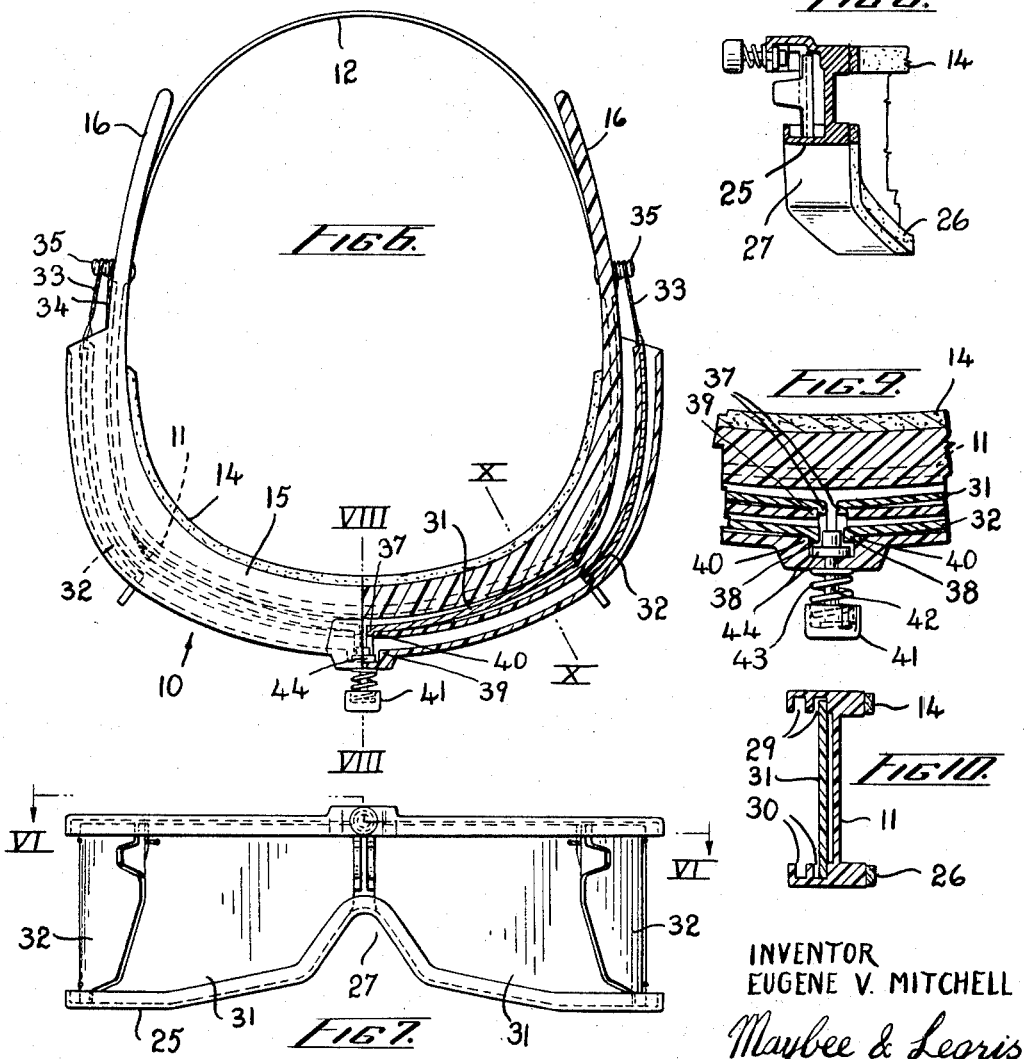

United States Patent Office 3,389,406
Patented June 25, 1968

3,389,406
RETRACTABLE MUD VISOR FOR GOGGLES
Eugene V. Mitchell, 145 Arlington Ave.,
Toronto, Ontario, Canada
Filed July 28, 1966, Ser. No. 568,636
9 Claims. (Cl. 2—14)

ABSTRACT OF THE DISCLOSURE

Goggles comprising a frame and an eye piece carried thereby are provided with a transparent shield which shields the eye piece and which can be quickly retracted. The shield comprises a pair of transparent visors slidable along a guide in the frame.

---

This invention relates to goggles and is primarily applicable to goggles intended for motorcyclists, jockeys, drivers of open vehicles, and other users whose vision might suddenly become obscured by mud or the like being splashed onto the eye pieces.

It is an object of the present invention to provide goggles having a transparent shield which normally shields the eye piece from splashes but which can be easily and quickly retracted, when itself splashed with mud, so as to provide a clear view directly through the eye piece.

According to the invention the shield comprises a pair of visors of transparent material, which are normally held against the action of resilient means in a frontal position so as to cover the eye piece, and a catch release device is provided for the purpose of releasing the visors so that they are quickly retracted sideways away from the eye piece by the resilient means. One or more pairs of visors may be provided and, if there are more than one pair, the catch release device may be operable to release the pairs of visors individually.

Two embodiments of the invention will now be described, by way of example, with reference to the accompanying drawings in which:

FIGURE 1 is a perspective view of the first embodiment, showing the visors locked over the eye piece;

FIGURE 2 is a perspective view of the same embodiment, showing the visors in their retracted position;

FIGURE 3 is a plan view of the embodiment shown in FIGURES 1 and 2;

FIGURE 4 is a section on line IV—IV in FIGURE 3;

FIGURE 5 is a perspective view of the second embodiment, showing the visors in their retracted position;

FIGURE 6 is a half-sectional plan on line VI—VI in FIGURE 7;

FIGURE 7 is a front elevation of the embodiment of FIGURES 5 and 6;

FIGURE 8 is a section of line VIII—VIII in FIGURE 6;

FIGURE 9 is a horizontal section through a fragment of the frame, the figure illustrating a detail of a catch release mechanism; and FIGURE 10 is a section on line X—X in FIGURE 6.

Referring to FIGURES 1-4, goggles according to the first embodiment of the invention comprise a rigid frame 10 and an eye piece 11 depending therefrom. A head strap 12 adapted to pass around the back of the head of the wearer is anchored to the frame 10 by studs 13. A strip of soft cushioning material such as sponge rubber 14 is cemented to the inside of the frame to provide a cushion for the wearer's forehead. In the embodiment illustrated the eye piece 11 and the frame 10 are constituted by a single moulding of rigid transparent plastic material. The frame 10 consists of a front piece 15, to the inside of which the cushioning strip 14 is cemented, and integral side pieces 16 extending rearwardly from front piece 15. The frame 10 is formed with a horizontally projecting outer edge portion 17, which portion is slotted on its underside to provide a continuous guide groove 18 (FIGURE 4) extending along the front and side pieces. The groove 18 is of generally circular cross-section and has a narrow mouth.

A pair of visors 19 are connected to the frame 10 by means of spherical studs 20 fixed to the upper edges of the visors 19 and engaging in the grooves 18. The visors 19, which are of transparent resiliently flexible material, are thus retained by the groove but slidable therealong from a central position as illustrated in FIGURE 1, at which they cover the eye piece 11, to respective end positions at the sides of the frame, as illustrated in FIGURE 2. The lower edges of the visors 19 are retained close to the eye piece by means of guide members 21 projecting outwardly from the lower edge of the eye piece. The visors 19 are biased towards their respective end positions by means of elastic extensions 22 of the head strap 12, the extensions being fastened to the visors. However, a simple purse-type clasp 23 normally holds the visors at their central positions against the action of the resilient extension straps 22. The clasp 23 comprises a pair of hooked members 24 respectively fixed to the adjacent edges of the visors and engaging one behind the other. In order to release the visors 19 the clasp 23 is easily unfastened, whereby the visors 19 are rapidly pulled to their end positions by the extension straps 22.

In the illustrated embodiment a single uninterrupted groove 18 is shown but it will be appreciated that the groove could be interrupted at its midpoint, i.e. at the center of the front piece 15 and so form two similar grooves each of which is continuous across half the front piece 15 and the associated front piece 16. Since the studs 20 do not have to pass across the center of the groove 18 it is immaterial whether the groove is interrupted at this point or not, and such a modification is deemed to be within the scope of the present invention.

In use of the goggles described above, the visors 19 normally cover the eye piece 11 and the wearer has clear vision through both the eye piece and the visors. If however mud is splashed onto the visors 19, thus obscuring his vision, the wearer simply unfastens the clasp 23 and the visors are immediately retracted, thus providing clear vision through the eye piece alone.

Referring now to FIGURES 5 to 10, in which parts corresponding to those of the preceding embodiment are denoted by the same reference numerals, two pairs of retractable visors are provided. The lower edge of the eye piece 11 is formed with a generally horizontally projecting flange 25, to the inner edge of which a second cushioning strip 26 is cemented. The front central portion of the flange 25 is shaped to form a nose bridge 27. The horizontal edge portion 17 of the preceding embodiment is replaced by a horizontal flange 28. The lower side of the flange 28 and the upper side of the flange 25 are formed with two parallel continuous guide grooves 29, 30 extending along the front and side pieces of the frame 10. The two pairs of grooves 29 and 30 are of rectangular cross-section, and the upper and lower edges of the visors 31 and 32 engage in them and are retained thereby. As in the preceding example, the visors 31 and 32 are of transparent resiliently flexible material and are retractable from a frontal position at which they cover the eye piece 11 to respective side positions at the sides of the frame. The visors are resiliently biased towards their side positions by means of tensioned elastic straps 33 and 34, which pass around studs 35 and 36 mounted on the ends of the frame and connected to the upper and lower edges of the visors. The central or adjacent edges of the visors 31, 32, are formed with short flanges 37 and 38, which engage abutment shoulders 39, 40, to hold the visors at their frontal position against the bias of the straps 43 and 44. The pairs of visors 31 and 32 may be released individually by means of a catch release member consisting of a push button 41 mounted on a pin 42 which extends to the midpoint of flange 28, a biasing spring 43, and a flange 44 which is adapted to engage the short flanges 47 and 38 to disengage them from their respective abutment shoulders.

When the goggles are in use the wearer normally has clear vision through the eye piece 11 and visors 31 and 32. If mud is splashed so as to obscure this vision, he simply depresses the push button 31, whereby the first pair of visors 32 are retracted. If mud is again splashed and so obscures the wearer's vision again, he simply presses the push button 41 to displace the second pair of visors, whereby they are retracted giving him clear vision through the eye piece alone. Finger gripping portions 45, 46, are formed at the adjacent edges of the pairs of visors 31 and 32 so that the visors may be easily reset for use again when cleaned.

What I claim as my invention is:

1. Goggles comprising a rigid frame and an eye piece carried thereby, the frame consisting of a front piece adapted to lie across the forehead with integral side pieces extending rearwardly from the front piece, which front and side pieces are formed with a horizontally projecting outer edge portion which is slotted on its underside to provide a continuous guide groove extending along the side and front pieces, a pair of visors of transparent material, means connecting the upper edges of the visors to the guide groove whereby the visors are retained by the groove but slidable therealong from a frontal position at which they cover the eye piece to respective end positions at the sides of the frame, tensioned resilient means connecting the visors with the side pieces so as to bias the visors towards their end positions, and a finger-operated catch for holding the visors at the central position against their bias, the catch being releasable to permit the visors to be retracted to their end positions by the action of the tensioned resilient means.

2. Goggles according to claim 1, wherein the catch consists of a pair of hooked members respectively fixed to the adjacent edges of the visors and locked one behind the other to hold the visors at their central position.

3. Goggles according to claim 1, wherein the means connecting the upper edges of the visors to the guide groove comprise at least two studs fixed to the upper edge of each visor and held captive within the guide groove for sliding movement therein.

4. Goggles comprising a rigid frame and an eye piece carried thereby, the frame consisting of a front piece adapted to lie across the forehead with integral side pieces extending rearwardly from the front piece, which front and side pieces are formed with a horizontally projecting outer edge portion which is slotted on its underside to provide a plurality of parallel continuous guide grooves extending along the side and front pieces, a plurality of pairs of visors of transparent flexible material, the upper edges of each pair of visors being connected to a respective guide groove thereby the visors are retained by the groove but slidable therealong from a frontal position at which they cover the eye piece to respective end positions at the sides of the frame, tensioned resilient means connecting the visors with the side pieces so as to bias the visors toward their end positions, and a finger-operated catch for holding the visors at the central position against their bias, the catch being releasable to release the pairs of visors individually and permit the visors to be retracted to their end positions by the action of the tensioned resilient means.

5. Goggles comprising a rigid frame and an eye piece carried thereby, the frame consisting of a front piece adapted to lie across the forehead with integral side pieces extending rearwardly from the front piece, which front and side pieces are formed with a horizontally projecting outer edge portion which is slotted on its underside to provide at least one continuous guide groove extending along the side and front pieces, at least one pair of visors of transparent flexible material, the upper edges of the visors engaging in the guide groove, or respective guide grooves, whereby the visors are retained thereby but slidable there along from a frontal position at which they cover the eye piece to end positions at the sides of the frame, tensioned resilient straps connecting the visors with the side pieces so as to bias them towards their end positions, means for holding each pair of visors against their bias at the frontal position, a manually operated catch release member cooperating with the holding means and operable to release the visors whereby they are retracted to their end positions by the action of the tensioned resilient straps, and guide means projecting from the lower edge of the eye piece, said guide means engaging the lower edges of the visors to retain the latter and prevent their flapping when in the frontal position.

6. Goggles according to claim 5, wherein the guide means comprises a generally horizontal flange projecting forwardly from the lower edge of the eye piece and having an upper surface with one or more continuous guide grooves in which the lower edges of the visors engage.

7. Goggles according to claim 6, in which the flange is shaped to provide a central nose bridge.

8. Goggles according to claim 5 wherein the adjacent edges of the visors are flanged and engaged behind abutment edges in the frame to hold the visors in their frontal position, and the catch release member comprises a centrally positioned push button which may be depressed against spring bias to cooperate with the flanged edges of the visors and disengage them from their abutment edges.

9. Goggles according to claim 1, wherein the front piece of the frame is lined on its rear surface with a layer of cushioning material.

References Cited

UNITED STATES PATENTS 2,813,271 11/1957 Finken _____ 2—6
2,886,819 5/1959 Uphoff _____ 2—14.1
2,907,041 10/1959 Finn _____ 2—14.4

HERBERT F. ROSS, *Primary Examiner.*